(12) United States Patent
Sendai et al.

(10) Patent No.: US 6,784,395 B2
(45) Date of Patent: Aug. 31, 2004

(54) ELECTRIC DISCHARGE MACHINE WITH CHANGING PROCESSING PARAMETERS

(75) Inventors: Tomoko Sendai, Tokyo (JP); Koji Enomoto, Tokyo (JP); Osamu Yasuda, Tokyo (JP); Yasuhiro Kawai, Tokyo (JP); Seiji Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/169,225

(22) PCT Filed: Oct. 25, 2001

(86) PCT No.: PCT/JP01/09386

§ 371 (c)(1), (2), (4) Date: Jun. 27, 2002

(87) PCT Pub. No.: WO02/34445

PCT Pub. Date: May 2, 2002

(65) Prior Publication Data

US 2003/0057188 A1 Mar. 27, 2003

(30) Foreign Application Priority Data

Oct. 27, 2000 (JP) .......................................... 2000-328514

(51) Int. Cl.$^7$ ............................. B23H 7/20; B23H 1/02; B23H 7/04

(52) U.S. Cl. ................................. 219/69.13; 219/69.13; 219/69.14; 700/162

(58) Field of Search ........................... 219/69.12, 69.14, 219/69.13; 700/162

(56) References Cited

U.S. PATENT DOCUMENTS 4,833,290 A * 5/1989 Obara ...................... 219/69.12
5,453,592 A * 9/1995 Takeuchi et al. ......... 219/69.12

FOREIGN PATENT DOCUMENTS

| EP | 0280735 | 9/1988 |
| JP | 56-76337 | 6/1981 |
| JP | 56-76340 | 6/1981 |
| JP | 4-122523 | 4/1992 |
| JP | 7-60548 | 3/1995 |

OTHER PUBLICATIONS

Parker, "Dictionary of Scientific and Technical Terms", 1989, McGraw–Hill, 4$^{th}$ editioin, p. 206.*

* cited by examiner

Primary Examiner—Geoffrey S. Evans
(74) Attorney, Agent, or Firm—Leydig, Voit & Mayer, Ltd.

(57) ABSTRACT

A wire-electrical discharge machine infuses a processing liquid in a gap between a wire and a workpiece and processes the workpiece using predetermined processing parameters. The machine includes a processing parameter memory that stores processing parameters, a second memory that stores a relationship between nozzle height and processing energy, a processing energy determining unit that determines the processing energy, for example, during rough processing, based on the relationship, and a processing parameter changing unit that changes the processing parameters based on the processing energy. The workpiece is processed using the changed processing parameters. According to this construction, wire breakage can be prevented and the accuracy of the processed surface can be improved.

7 Claims, 19 Drawing Sheets

Fig. 3

| NO | PLATE THICKNESS | UPPER NOZZLE HEIGHT | LOWER NOZZLE HEIGHT | ENERGY AMOUNT |
|---|---|---|---|---|
| 1 | 10 | 2 | 0 | 0.6 |
| 2 | 10 | 20 | 0 | 0.5 |
| 3 | 10 | 0 | 2 | 0.5 |
| 4 | 10 | 0 | 20 | 0.3 |

Fig. 6

| NO | PLATE THICKNESS | UPPER NOZZLE HEIGHT | LOWER NOZZLE HEIGHT | LIQUID FLOW RATE |
|---|---|---|---|---|
| 1 | 10 | 2 | 0 | 0.6 |
| 2 | 10 | 20 | 0 | 0.5 |
| 3 | 10 | 0 | 2 | 0.5 |
| 4 | 10 | 0 | 20 | 0.3 |

Fig. 9

| NO | PLATE THICKNESS | UPPER NOZZLE HEIGHT | LOWER NOZZLE HEIGHT | TILT CORRECTION VALUE (μM) |
|---|---|---|---|---|
| 1 | 10 | 2 | 0 | 2 |
| 2 | 10 | 20 | 0 | 5 |
| 3 | 10 | 0 | 2 | 2 |
| 4 | 10 | 0 | 20 | 5 |

Fig. 13

| NO | PLATE THICKNESS | UPPER NOZZLE HEIGHT | LOWER NOZZLE HEIGHT | SHIFT AMOUNT (μM) |
|---|---|---|---|---|
| 1 | 10 | 2 | 0 | 5 |
| 2 | 10 | 20 | 0 | 10 |
| 3 | 10 | 0 | 2 | 5 |
| 4 | 10 | 0 | 20 | 10 |

Fig. 17

| NO | PLATE THICKNESS | PROCESSING SPEED (MM/MIN) | UPPER NOZZLE HEIGHT | LOWER NOZZLE HEIGHT |
|---|---|---|---|---|
| 1 | 10 | 10 | 2 | 0 |
| 2 | 10 | 5 | 20 | 0 |
| 3 | 10 | 4 | 0 | 2 |
| 4 | 10 | 3 | 0 | 20 |

ELECTRIC DISCHARGE MACHINE WITH CHANGING PROCESSING PARAMETERS

TECHNICAL FIELD

The present invention relates to a wire-electrical discharge machine.

BACKGROUND ART

Generally, wire-electrical discharge machining involves three to seven processing steps that include rough processing, intermediate processing, semi-finishing, and finishing, wherein the processing is performed while reducing the amount of energy. The purpose of this is to reduce the processing time by gradually reducing the surface roughness, as well as to increase the precision of the straightness of the processed surface. Furthermore, it is known that during wire-electrical discharge machining, due to wire vibration caused by discharge repulsion, electrostatic force or the like, the part of the wire facing the center part of a workpiece may become dented, or may swell into a so-called 'drum shape'. Furthermore, the processing conditions are completely different between the first processing step (rough processing) and the subsequent processing steps (intermediate processing, semi-finishing, and finishing). In the first processing step, because processing is performed on a virgin workpiece, there is a danger that processing debris will not be adequately eliminated from the workpiece, and that the wire may break due to the presence of the debris.

FIG. 19 depicts a conventional wire-electrical discharge machine as disclosed in Japanese Patent Publication No. 7-16825, which includes input means 120 for inputting the plate thickness of a workpiece, the heights of nozzles and the like, processing parameter storage means 121 that stores the charging voltage, the ON period, the OFF period and the like, liquid pressure calculation means 122 that calculates the nozzle liquid pressure from the nozzle heights and other parameters, and processing parameter changing means 123 that changes the processing parameters based on the calculated nozzle liquid pressure, and seeks the nozzle liquid pressure, i.e., the processing liquid pressure, based on the nozzle heights, and changes the processing parameters based on the processing liquid pressure. In the first processing step, however, if the nozzles are sufficiently distanced from the workpiece, wire breakage is caused not by the liquid pressure during processing but by the wire length. It is therefore difficult to reliably prevent breakage of the wire using the method in which the processing parameters are calculated from the processing liquid pressure. In actual experiments, it has been determined that where the distance between the upper nozzle and the workpiece was 2 mm, (with a plate thickness of 20 mm and a wire having a diameter of 0.25 mm), the processing liquid pressure varies, but where the distance is longer than it, there is no change in processing liquid pressure. However, the problem arises that when the wire is long, it warps easily, and it is difficult to perform control when a short-circuit occurs, resulting in an increased likelihood of wire breakage. The present invention has been developed to solve the above-described problems, and an object thereof is to provide a wire-electrical discharge machine wherein the wire is not likely to break even where the nozzles are located at a distance from the workpiece. Furthermore, while the surface precision of the processed surface and processing accuracy are important in wire-electrical discharge machining, such processing accuracy is not taken into account in the conventional art.

DISCLOSURE OF THE INVENTION

The wire-electrical discharge machine according to a first aspect of the present invention includes processing parameter storage means that stores processing parameters, means that stores a relationship between a nozzle height and an amount of processing energy, processing energy determining means that determines the amount of processing energy during rough processing based on such relationship, and processing parameter changing means that changes the processing parameters based on the amount of processing energy. The workpiece is processed using the changed processing parameters. According to this construction, because the amount of processing energy is determined based on the wire nozzle height, the wire is not likely to break even where the nozzle is located at a far distance.

The wire-electrical discharge machine according to a second aspect of the present invention includes processing parameter storage means that stores standard processing parameters, means that stores a relationship between a nozzle height and an amount of liquid flow, means that determines the amount of liquid flow during rough processing based on such relationship, and liquid flow rate changing means that changes a liquid flow rate parameter among the processing parameters. The workpiece is processed using the changed processing parameters. According to this construction, because the processing liquid flow rate is determined in accordance with the nozzle height, the wire is not likely to break.

The wire-electrical discharge machine according to a third aspect of the present invention includes processing parameter storage means that stores standard processing parameters, means that stores a relationship between a nozzle height and an amount of wire tilt, tilt correction value determining means that determines the amount of wire tilt during processing based on such relationship, and tilt correction value changing means that changes a tilt correction value parameter among the processing parameters. The workpiece is processed using the changed processing parameters. According to this construction, the tilt caused by warping of the wire is corrected, thereby increasing surface precision and processing accuracy.

The wire-electrical discharge machine according to a fourth aspect of the present invention includes processing parameter storage means that stores standard processing parameters, means that stores a relationship between a nozzle height and an amount of wire shift, shift amount correction value determining means that determines the amount of wire shift during processing based on such relationship, and shift amount changing means that changes a wire shift amount parameter among the processing parameters. The workpiece is processed using the changed processing parameters. According to this construction, the amount of wire shift takes into account the degree of warping of the wire, thereby improving surface precision.

The wire-electrical discharge machine according to a fifth aspect of the present invention includes processing parameter storage means that stores standard processing parameters, nozzle distance detection means that detects a processing state in a first processing step and detects a nozzle distance from the detected processing state, and processing parameter determining means that determines the processing parameters for subsequent processing steps based on the detected nozzle distance. The workpiece is processed using the determined processing parameters. According to this construction, because the correct nozzle height can be automatically detected and correction can be performed in accordance with such nozzle height, surface precision can be improved.

In the wire-electrical discharge machine according to the fifth aspect of the present invention, the wire-electrical discharge machine according to a sixth aspect of the present invention detects the processing speed as the processing state. According to this construction, surface precision is improved.

In the wire-electrical discharge machine according to the fifth aspect of the present invention, the wire-electrical discharge machine according to a seventh aspect of the present invention further includes means for displaying a state of separation of a wire nozzle in a graphical fashion. According to this construction, errors during setting or inputting can be prevented.

BRIEF DESCRIPTION OF THE DRAWINGS

FIG. 3 is an explanatory drawing showing the construction of a processing energy database in connection with Embodiment 1 of the present invention;

FIG. 6 is an explanatory drawing showing the construction of a liquid flow rate database in connection with Embodiment 2 of the present invention;

FIG. 9 is an explanatory drawing showing the construction of a tilt correction value database in connection with Embodiment 3 of the present invention;

FIG. 13 is an explanatory drawing showing the construction of a shift amount correction value database in connection with Embodiment 4 of the present invention;

FIG. 17 is an explanatory drawing showing the construction of a processing speed database in connection with Embodiment 5 of the present invention;

BEST MODE FOR CARRYING OUT THE INVENTION

Figure 1:
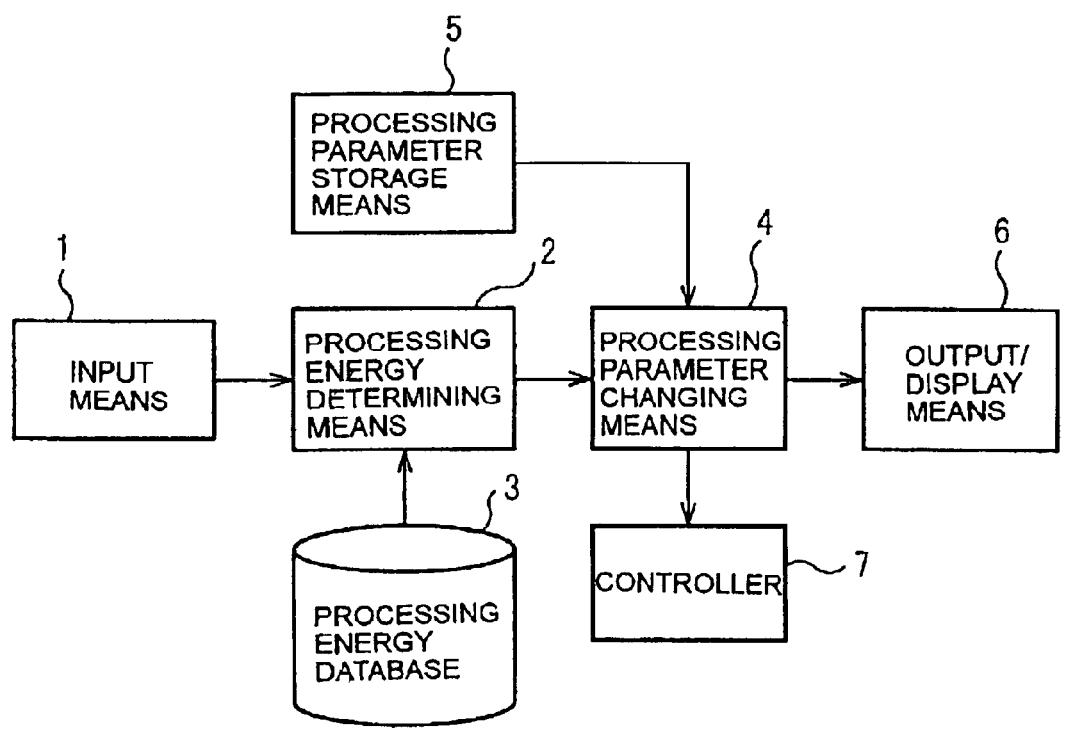
FIG. 1 is a block diagram showing the construction of Embodiment 1 of the present invention.

Embodiments of the present invention will be described below with reference to the drawings. In the drawings, identical or equivalent components are assigned the same symbols, and explanation thereof will be omitted.

Embodiment 1

Figures 10A, 10B, 10C:
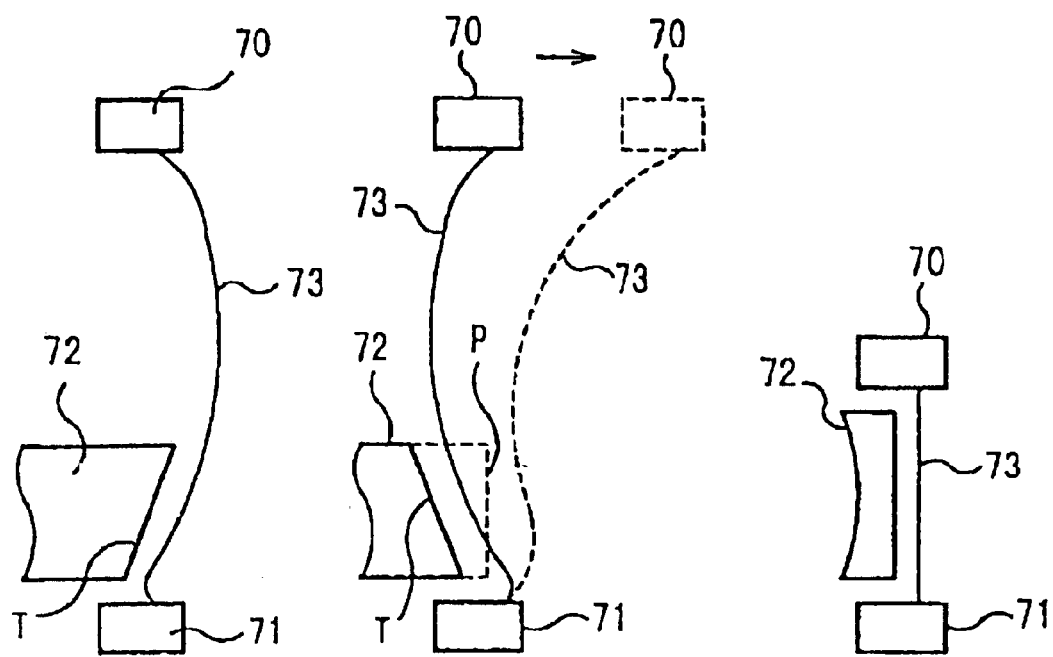
FIGS. 10A–10C are diagrams showing the state of a wire in connection with Embodiment 3 of the present invention.

FIG. 1 is a block diagram of Embodiment 1 of the present invention. In the drawing, 1 is input means that is normally a keyboard, and 2 is processing energy determining means. 3 is a processing energy database, and as shown in FIG. 3, the processing energy amounts with which the wire will not break are stored corresponding to various combinations of the plate thickness of the workpiece, the upper nozzle height and the lower nozzle height, as percentages of the normal standard processing parameters described above. Regarding the nozzle heights, the upper nozzle 70 is separated from the workpiece 72 as shown in FIG. 10A, for example. This percentage data exists only with regard to the first processing step. The processing energy is determined by the processing energy determining means 2 based on the data regarding the plate thickness, the upper nozzle height and the lower nozzle height read out from the processing energy database 3. The processing energy data determined by the processing energy determining means 2 is sent to the processing parameter changing means 4. 5 is processing parameter storage means that stores the charging voltage, the ON period, the OFF period, the shift amount and the like as standard processing parameters (n steps n≧1) during nozzle contact (i.e., when the nozzles are in contact with the workpiece). The processing parameter changing means 4 changes the processing parameters sent from the processing parameter storage means based on the processing energy data determined by the processing energy determining means 2, outputs it to a controller 7, or displays the processing parameters on a screen (not shown) of an output/display means 6. Here, regarding the nozzle heights, the nozzle 70 is separated from the workpiece 72 as shown in of FIG. 10A, for example.

Figure 2:
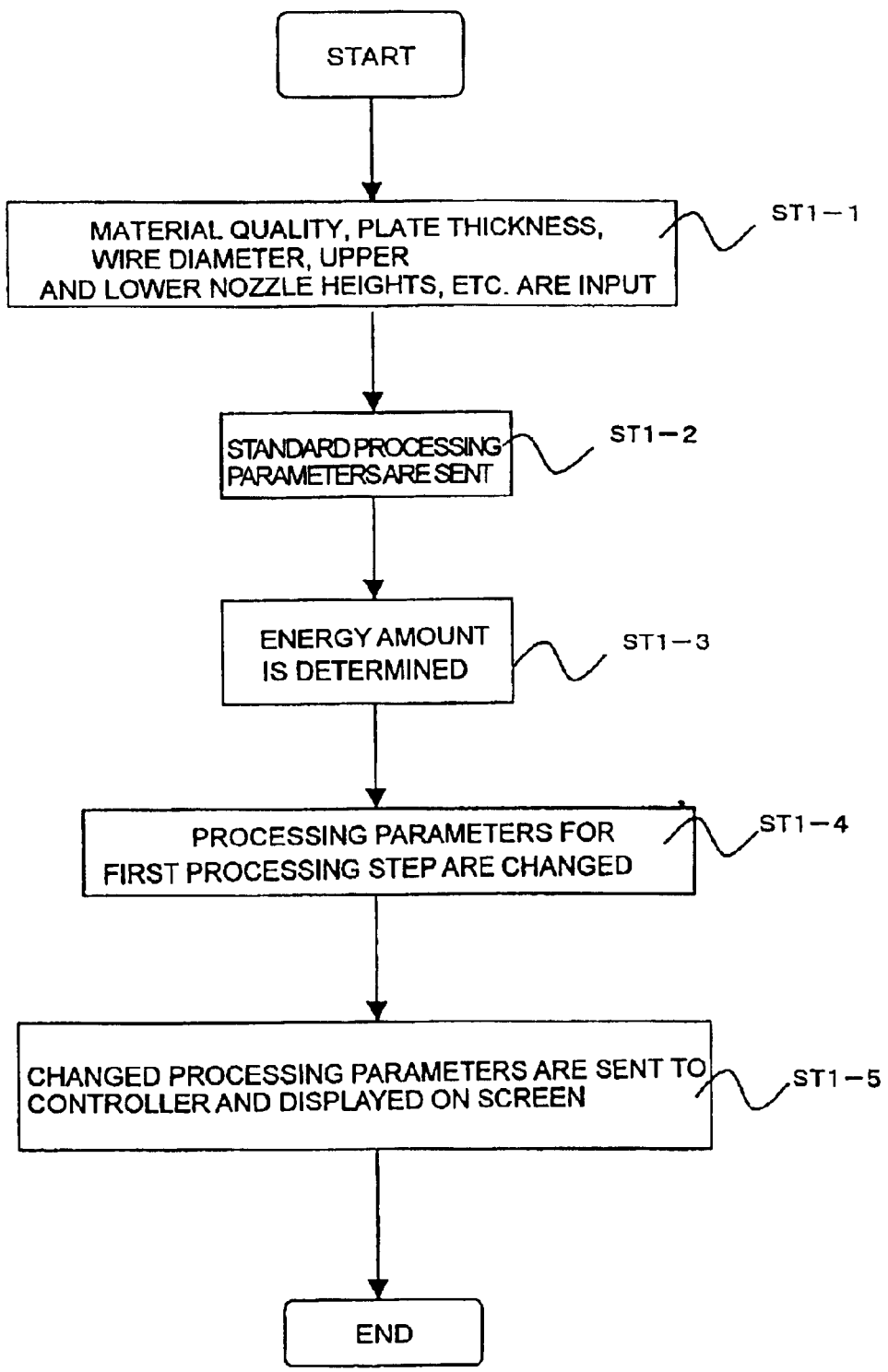
FIG. 2 is a flow chart showing the operation of Embodiment 1 of the present invention.

FIG. 2 is a flow chart showing the operation of Embodiment 1 of the present invention.

The first operation will now be explained with reference to FIG. 2. The material quality, plate thickness, wire diameter, upper nozzle height, lower nozzle height and the like are input to the processing energy determining means 2 via the input means 1 (ST 1-1). The standard processing parameters determined based on the material quality, plate thickness, wire diameter and the like where the nozzles are in contact with the workpiece are stored beforehand in the processing parameter storage means 3, and these standard processing parameters are sent to the processing parameter changing means 4 (ST 1-2). Based on the material quality, plate thickness, wire diameter, upper nozzle height, lower nozzle height and the like input by the input means 1, the processing energy determining means 2 determines the amount of processing energy from the table stored in the processing energy database 3 and shown in FIG. 3 (ST 2-3). In FIG. 3, where the plate thickness is '10', the upper nozzle separation amount is '20' and the lower nozzle separation amount is '0', for example, the processing energy amount is '0.5' according to No. 2 in FIG. 3, and the processing energy amount is determined as 50% of the standard first-step amount by the processing energy determining means 2. The '0.5' information is sent from the processing energy determining means 2 to the processing parameter changing means 4. The processing parameter changing means 4 reduces the processing energy amount by 50% by increasing the OFF period. The processing parameter changing means 4 changes the standard first-step processing parameters based on the processing energy amount (ST 2-4). The changed first-step processing parameters are sent to the controller 7 together with the unchanged processing parameters for the second and subsequent processing steps, and are displayed on the screen (not shown) of the output/display means 6 (ST 1-5). The controller 7 performs first-step processing of the workpiece in accordance with the processing parameters. During the second and subsequent processing steps, because there is no need to reduce the processing energy level since the wire will not break, processing takes place without a change in the processing parameters. According to this Embodiment 1, because the energy amount is controlled in accordance with the nozzle separation amounts, wire breakage can be prevented.

In Embodiment 1, the processing energy amount is determined based on the data stored in the processing energy database, but it is also acceptable if it is derived through an approximate expression for an energy amount sought from the nozzle heights and the plate thickness.

The method in which the processing energy amount is reduced by 50% has been described as a method in which the OFF period is increased, but various other methods may also be used, such as a method in which the ON period is decreased or the servomotor voltage is increased.

Where the processing energy amount corresponding to the wire nozzle separation amounts is not known, a processing energy amount such as '0.4' may be input directly.

While standard processing parameters have been described as being stored beforehand in the processing parameter storage means 5, it is acceptable if the standard processing parameters are determined by different means, such as through user input.

While the method of expression of the energy amount has been described as a percentage of the standard processing parameters for first-step processing, it may also take the form of a value calculated directly as the energy amount within a certain period of time based on the current waveform information such as the ON period, the OFF period or the like. This energy amount expresses the actual energy amount itself. On the other hand, the energy amounts shown in FIG. 3 are different in that they are expressed as percentages of the standard processing parameters, as described above.

Embodiment 2

Figure 4:
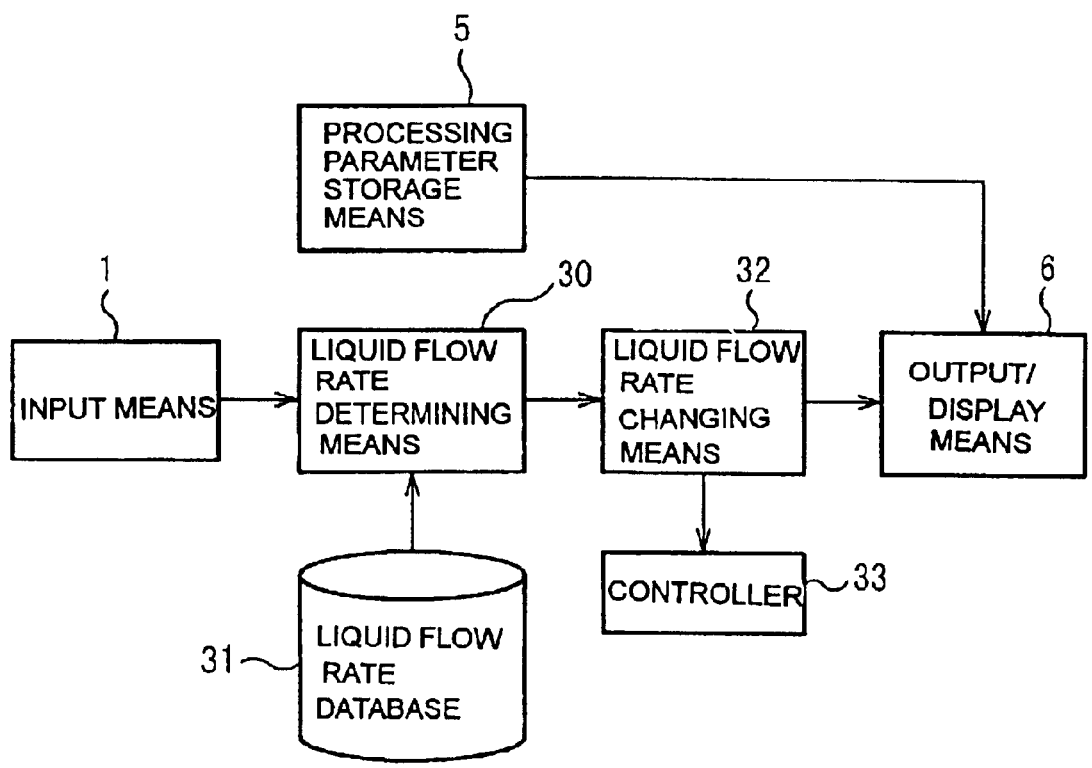
FIG. 4 is a block diagram showing the construction of Embodiment 2 of the present invention.
Figure 5:
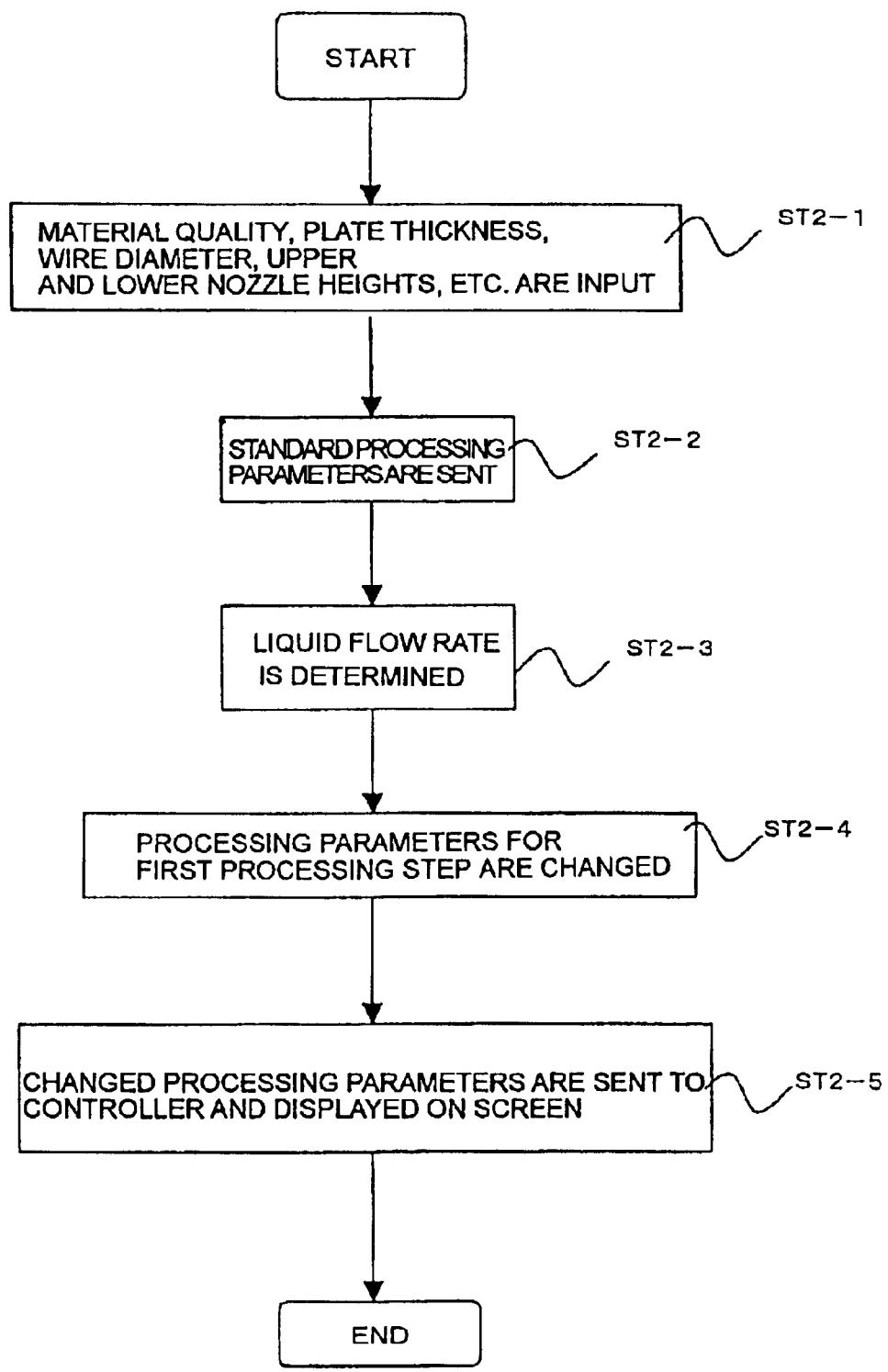
FIG. 5 is a flow chart showing the operation of Embodiment 2 of the present invention.

FIG. 4 is a block diagram of Embodiment 2 of the present invention, and FIG. 5 is a flow chart showing the operation thereof. In FIG. 4, 1 is the same input means used in Embodiment 1, and a keyboard is normally used therefor. 30 is liquid flow rate determining means pertaining to the processing liquid flow rate (hereinafter 'liquid flow rate'), and 31 is a liquid flow rate database. As shown in FIG. 6, liquid flow rates that will not break the wire are stored in this liquid flow rate database 31 as percentages of the standard processing parameters corresponding to various combinations of workpiece plate thickness, upper nozzle height and lower nozzle height. This percentage data pertains to processing for the first processing step only. The liquid flow rate determining means 30 determines the liquid flow rate based on the data read out from the liquid flow rate database 31. The liquid flow rate data determined by the liquid flow rate determining means 30 is sent to liquid flow rate changing means 32. 5 is the same processing parameter storage means used in Embodiment 1, and this means stores such parameters as the charging voltage, the ON period, the OFF period, the shift amount and the liquid flow rate as standard processing parameters (n steps: n≧1) during nozzle contact (i.e., when the nozzles are in contact with the workpiece). The liquid flow rate changing means 32 changes the liquid flow rate (liquid flow rate parameter) sent by the processing parameter storage means 5 based on the liquid flow rate determined by the liquid flow rate determining means 30, and the changed liquid flow rate is output to the controller 7 and displayed on the screen (not shown) of an output/display means 6.

The processing operation of the first processing step will now be described with reference to FIG. 5. The material quality, plate thickness, wire diameter, upper nozzle height, lower nozzle height and the like are input to the liquid flow rate determining means 30 via the input means 1 (ST 2-1). The standard processing parameters determined based on the material quality, plate thickness, wire diameter and the like where the nozzles are in contact with the workpiece are stored beforehand in the processing parameter storage means 5, and these standard processing parameters are sent to the liquid flow rate changing means 12 (ST 2-2). When the material quality, plate thickness, wire diameter, upper nozzle height, lower nozzle height and the like are input using the input means 1, the liquid flow rate determining means 30 determines the liquid flow rate based on the liquid flow rate from the liquid flow rate database 31 (ST 2-3). For example, where the plate thickness is '10', the upper nozzle separation amount is '20' and the lower nozzle separation amount is '0', the liquid flow rate is '0.5' according to No. 2 in FIG. 6, and the liquid flow rate is determined as 50% of the standard first-step amount by the liquid flow rate determining means 30. The '50%' information is sent by the liquid flow rate determining means 30 to the liquid flow rate changing means 32. Based on the liquid flow rate sent by the processing parameter storage means 5, the liquid flow rate changing means 32 changes the liquid flow rate for the standard first-step processing (the liquid flow rate parameter) (ST 2-4). The changed first-step liquid flow rate is sent to the controller 33 together with the unchanged processing parameters for the second and subsequent processing steps, and is displayed on the screen (not shown) of the output/display means 6 (ST 2-5). The controller 33 performs first-step processing of the workpiece in accordance with the changed liquid flow rate. During the second and subsequent processing steps, because one side of the wire is open and is not affected by the liquid flow rate, processing takes place without a change in the liquid flow rate.

By adjusting the liquid flow rate, the processing liquid flows smoothly and wire breakage is prevented. For example, it is known that where the upper nozzle is separated from the workpiece, wire breakage is less likely if the upper nozzle liquid amount is about half the normal value. According to this Embodiment 2, because the processing liquid amount is controlled in accordance with the nozzle separation amounts, wire breakage can be prevented.

The liquid flow rate has been described as being stored in the liquid flow rate database 31, but it is also acceptable if it is derived through an approximate expression for a liquid flow rate sought from the nozzle heights and the plate thickness.

Furthermore, while standard processing parameters have been described as being stored beforehand in the processing parameter storage means 5, it is acceptable if the standard processing parameters are determined by different means, such as through user input.

Embodiment 3

Figure 7:
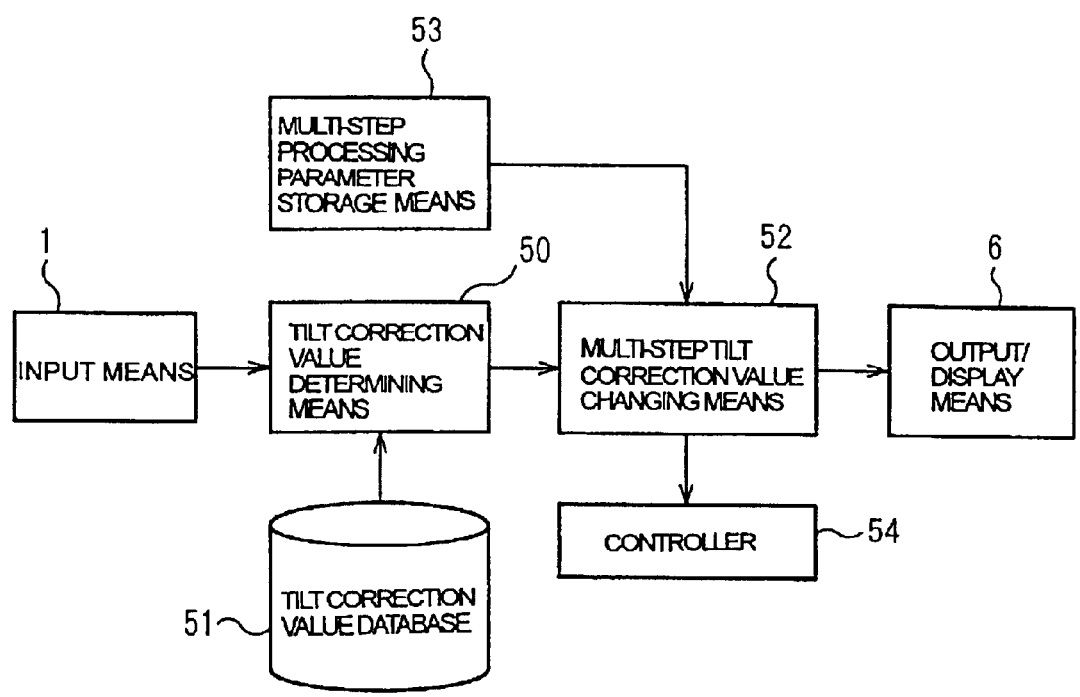
FIG. 7 is a block diagram showing the construction of Embodiment 3 of the present invention.
Figure 8:
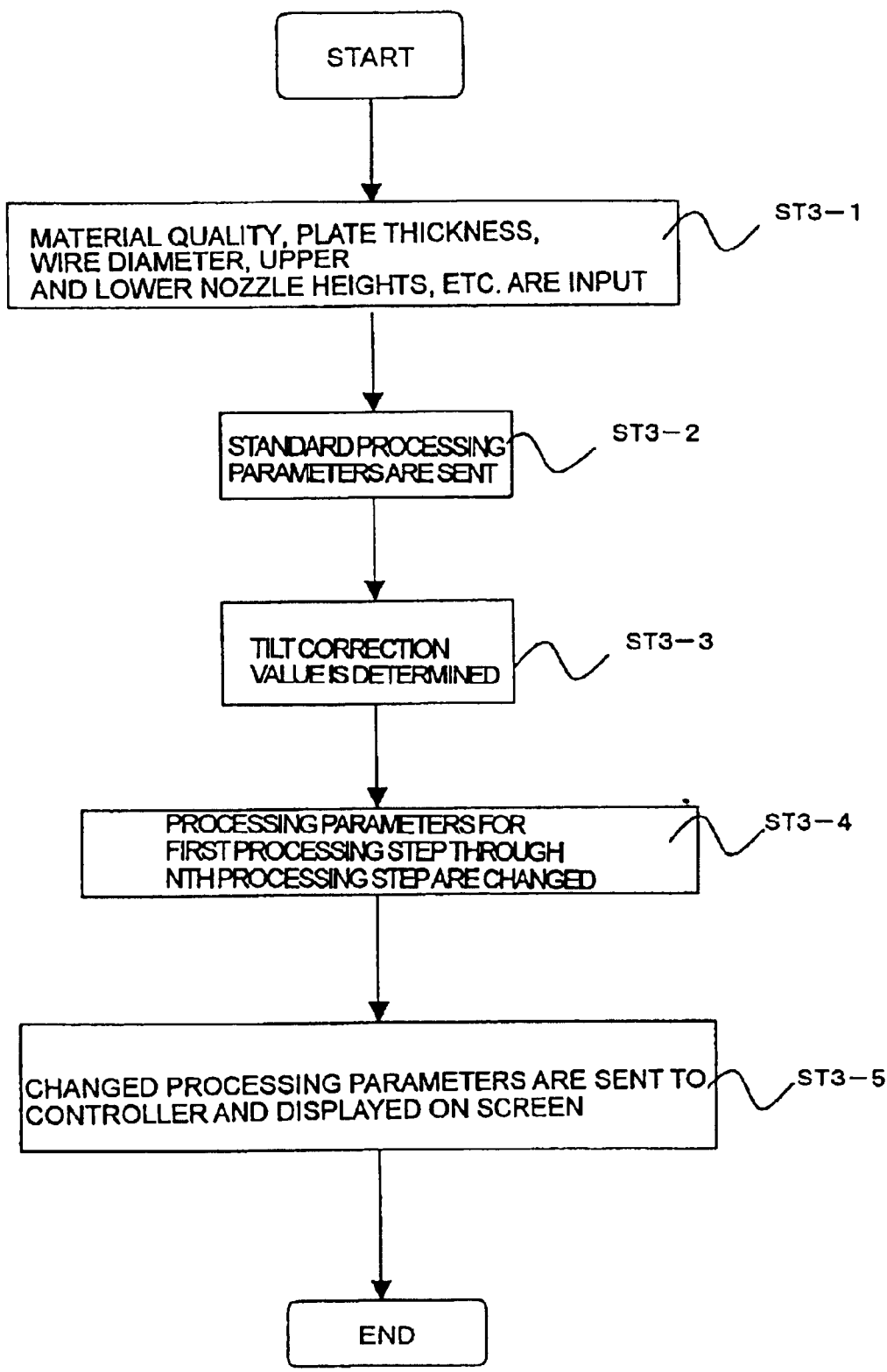
FIG. 8 is a flow chart showing the operation of Embodiment 3 of the present invention.

FIG. 7 is a block diagram showing Embodiment 3 of the present invention, and FIG. 8 is a flow chart showing the operation thereof. In FIG. 7, 1 is the same input means, and is normally a keyboard as in Embodiment 1. 50 is tilt correction value determining means, and 51 is a tilt correction value database. As shown in FIG. 9, accuracy-compensating wire tilt correction values corresponding to various combinations of workpiece plate thickness, upper nozzle height and lower nozzle height are stored as wire tilt correction values for all processing steps in normal standard processing. The tilt correction value determining means 50 determines the wire tilt correction value based on the data read out from the tilt correction value database 51. The tilt correction value data determined by the tilt correction value determining means 50 is sent to a multi-step tilt correction value changing means 52. 53 is a multi-step processing parameter storage means, which stores such parameters as the charging voltage, the ON period, the OFF period, the shift amount and the tilt of the wire as standard processing parameters (n steps: $n \geq 1$) during nozzle contact (i.e., when the nozzles are in contact with the workpiece). The multi-step tilt correction value changing means 52 changes the processing parameter (wire tilt parameter) sent from the multi-step processing parameter storage means 53 based on the tilt correction value determined by the tilt correction value determining means 50, outputs it to the controller 54, and displays the tilt correction value on the screen (not shown) of an output/display means 6.

The operation of Embodiment 3 will now be described with reference to FIG. 8. The material quality, plate thickness, wire diameter, upper nozzle height, lower nozzle height and the like are input via the input means 1 (ST 3-1). The standard processing parameters determined based on the material quality, plate thickness, wire diameter and the like where the nozzles are in contact with the workpiece are stored beforehand in the multi-step processing parameter storage means 53, and these standard processing parameters are sent to the multi-step tilt correction value changing means 52 (ST 3-2). When the material quality, plate thickness, wire diameter, upper nozzle height, lower nozzle height and the like are input using the input means 1, the tilt correction value determining means 50 determines the tilt correction value based on the tilt correction value sent from the tilt correction value database 51 (ST 3-3). For example, where the plate thickness is '10', the upper nozzle separation amount is '20' and the lower nozzle separation amount is '0', the tilt correction value is '5' according to No. 2 in FIG. 9, and this '5' information is sent by the tilt correction value determining means 50 to the multi-step tilt correction value changing means 52. The multi-step tilt correction value changing means 52 changes the processing parameter, i.e., the tilt (tilt parameter) for the first through $n^{th}$ steps of standard processing using the tilt correction value 5 (ST 3-4). The changed processing parameters for the first through $n^{th}$ steps are sent to the controller 54, and are displayed on the screen (not shown) of an output/display means 6 (ST 3-5). The controller 54 performs first-step through $n^{th}$-step processing of the workpiece with the wire tilted, in accordance with the processing parameters.

FIGS. 10A–10C are drawings showing situations in which one of the 10 nozzles is separated from the workpiece. FIG. 10C shows the case where the upper nozzle 70 and the lower nozzle 71 are in contact with the workpiece 72, while the solid lines in FIGS. 10A and 10B show the case in which the upper nozzle 70 is separated from the workpiece 72, the wire 73 warps as a result, causing a tapered surface T to be formed in the workpiece 72 due to discharge repulsion force or electrostatic force. Accordingly, in the case shown in FIG. 10B, for example, by moving the upper nozzle 70 outward in the direction of the arrow and tilting the wire 73 by the angle θ corresponding to the tilt correction value of the wire 73, as shown by the dotted line, the surface of the workpiece can be finished via processing into the vertical surface P. While in Embodiment 3, the wire tilt amount for all processing steps is corrected using the same tilt correction value as that saved in the tilt correction value database 51, but it is also acceptable if, for example, correction is performed for only the $n^{th}$ step, or if a separate tilt correction value is used for the first step, the second step, etc., up to the $n^{th}$ step.

Moreover, while the wire tilt correction value has been described as being stored in the tilt correction value database 51, it may also be derived through an approximate expression for the wire tilt correction value sought from the nozzle heights and the plate thickness.

Furthermore, while in Embodiment 3 the wire tilt correction value has been described as included in the processing parameters, it is also acceptable if the wire tilt correction value is stored in a different form from the processing parameters so long as the wire tilt can be corrected during processing.

In Embodiments 1 and 2 described above, the processing parameters and liquid flow rate are adjusted so as to prevent breakage of the wire during the first processing step, but in Embodiment 3, the surface precision and configuration accuracy of the processed surface can be improved.

Embodiment 4

Figure 11:
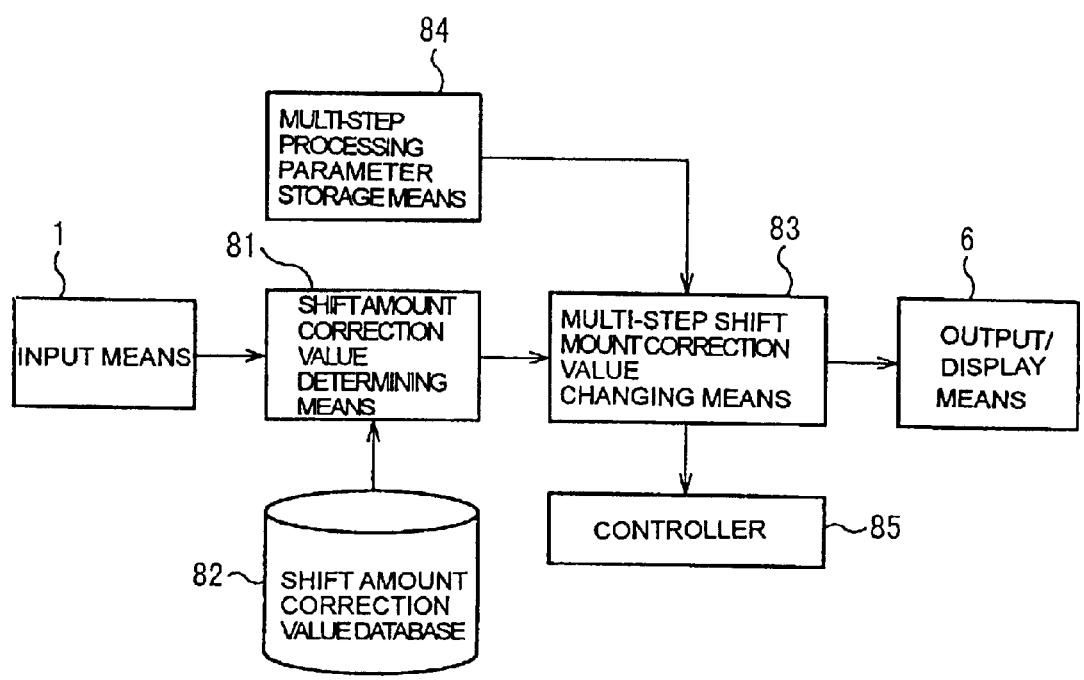
FIG. 11 is a block diagram showing the construction of Embodiment 4 of the present invention.
Figure 12:
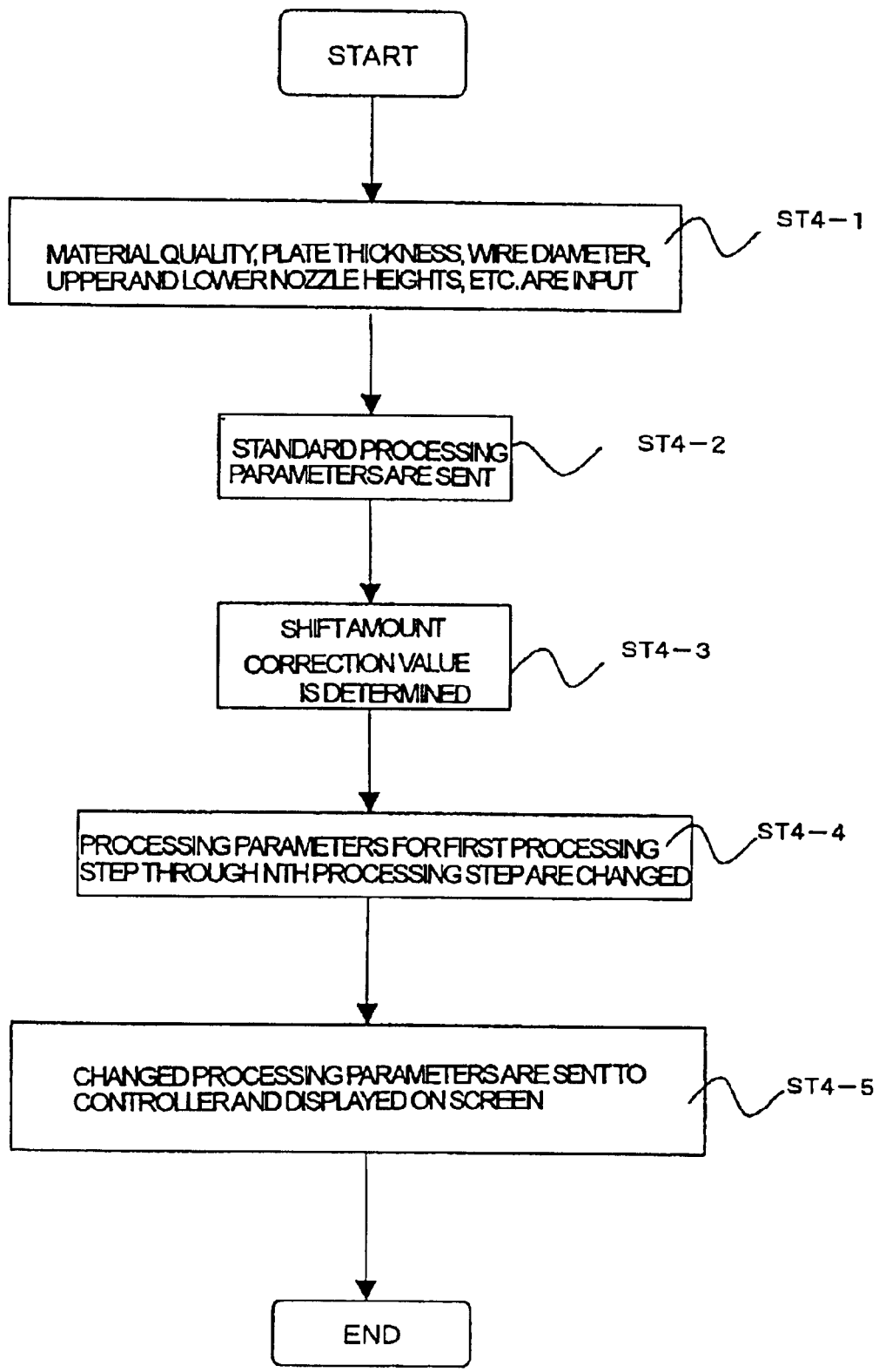
FIG. 12 is a flow chart showing the operation of Embodiment 4 of the present invention.

FIG. 11 is a block diagram showing Embodiment 4 of the present invention, and FIG. 12 is a flow chart showing the operation thereof. In FIG. 11, 1 is input means, and is normally a keyboard as in Embodiment 1. 81 is shift amount correction value determining means, and 82 is a shift amount correction value database. As shown in FIG. 13, this database stores wire shift amount correction values for the accuracy-compensating second processing step corresponding to various combinations of workpiece plate thickness, upper nozzle height and lower nozzle height as correction values for the shift amount, which is one of the above normal standard processing parameters for the second processing step. The shift amount correction value determining means 81 determines the shift amount correction value based on the data read out from the shift amount correction value database 82. The shift amount correction value data determined by the shift amount correction value determining means 81 is sent to the multi-step shift amount correction value changing means 83. 84 is a multi-step processing parameter storage means, which stores such parameters as the charging voltage, the ON period, the OFF period, and the shift amount as standard processing parameters (n steps: $n \geq 1$) during nozzle contact (i.e., when the nozzles are in contact with the workpiece). The multi-step shift amount correction value changing means 83 changes the shift amount parameter correction value for the second processing step sent from the multi-step processing parameter storage means 84 based on the shift amount correction value determined by the shift amount correction value determining means 81, outputs it to the controller 85, and displays the shift amount correction value on the screen (not shown) of an output/display means 6.

The operation of Embodiment 4 will now be described with reference to FIG. 12. The material quality, plate thickness, wire diameter, upper nozzle height, lower nozzle height and the like are input via the input means 1 (ST 4-1). The standard processing parameters determined based on the material quality, plate thickness, wire diameter and the like where the nozzles are in contact with the workpiece are stored beforehand in the multi-step processing parameter storage means 84, and these standard processing parameters are sent to the multi-step shift amount changing means 83 (ST 4-2). When the material quality, plate thickness, wire diameter, upper nozzle height, lower nozzle height and the like are input using the input means 1, the multi-step shift amount determining means 81 determines the shift amount correction value based on the shift amount correction value sent from the shift amount correction value database 82. For example, where the plate thickness is '10', the upper nozzle separation amount is '20' and the lower nozzle separation amount is '0', the shift amount correction value is '10' according to No. 2 in FIG. 13, and the shift amount correction value for the second processing step of standard processing is determined to be '10' (ST 4-3). This '10' information is sent from the shift amount correction value determining means 81 to the multi-step shift amount correction value changing means 83. The multi-step shift amount correction value changing means 83 changes the shift amount, one of the processing parameters for the second processing step, using the shift amount correction value (ST 4-4). The processing parameters for the second processing step in which the shift amount has been changed are sent to the controller 85 together with the processing parameters for the first processing step and the processing parameters for the third and subsequent steps, and are output and displayed on the screen (not shown) of the display means 6 (ST 4-5). The controller 85 performs processing in accordance with the processing parameters.

Figure 14:
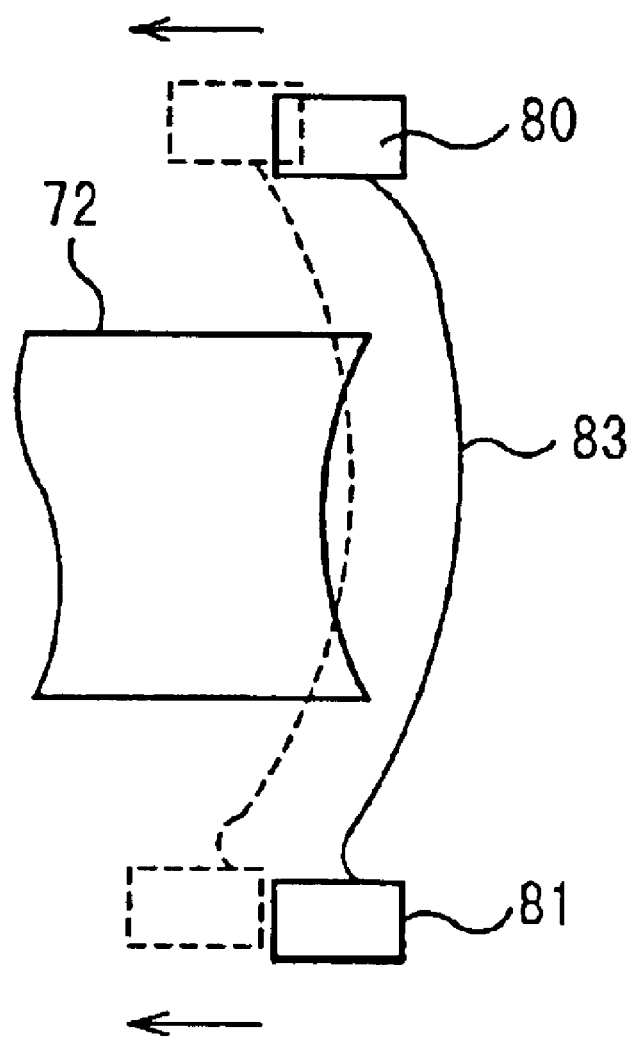
FIG. 14 is a diagram showing the state of the wire in connection with Embodiment 4 of the present invention.

FIG. 14 is an image drawing showing the situation in which the upper nozzle 80 and the lower nozzle 81 are separated from the workpiece. Where the nozzles are separated, warp is caused in the wire 83, and when the second processing step is performed, if the wire 73 is in the position indicated by the solid line, discharge no longer takes place in the center of the workpiece because the processed surface of the workpiece 72 becomes concave. Accordingly, by moving the upper nozzle 80 and the lower nozzle 81 in the direction of the arrow to the positions indicated by the dotted lines to change the shift amount, processing accuracy can be improved. Here, as shown in FIG. 14, the shift amount is the distance by which the upper nozzle 80 and the lower nozzle 81 are shifted by the same distance (from the positions of the wire and nozzles indicated by the solid lines to the positions indicated by the dotted lines).

While the shift amount correction value for the second processing step is held in the database in Embodiment 4, it is also acceptable if correction is performed only for a different processing step, or if a separate correction value is held for each individual processing step, such as for the first, second, and nth processing step.

It is furthermore acceptable in Embodiment 4 if other processing parameters that affect the shift amount are changed. For example, the shift amount may be changed if the ON period, processing conveyance speed, discharge voltage or the like is changed.

Embodiment 5

Figure 15:
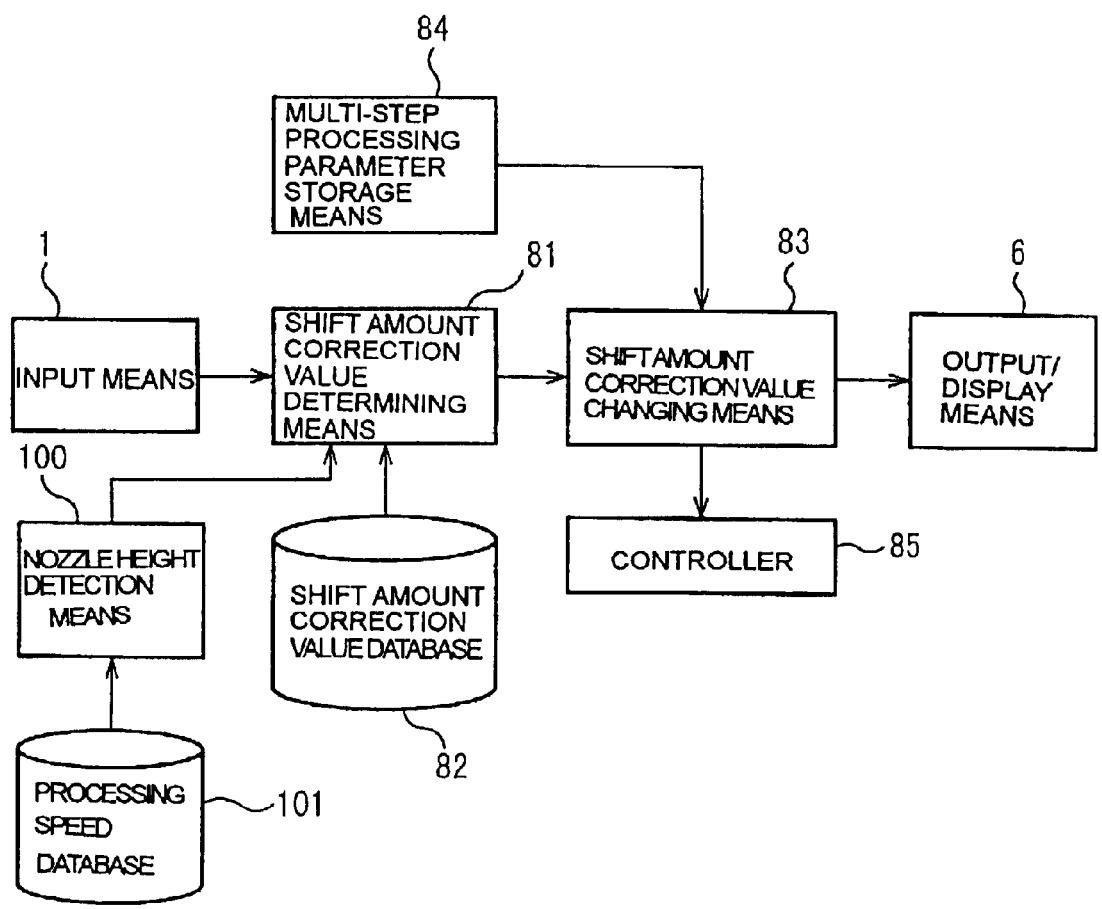
FIG. 15 is a block diagram showing the construction of Embodiment 5 of the present invention.
Figure 16:
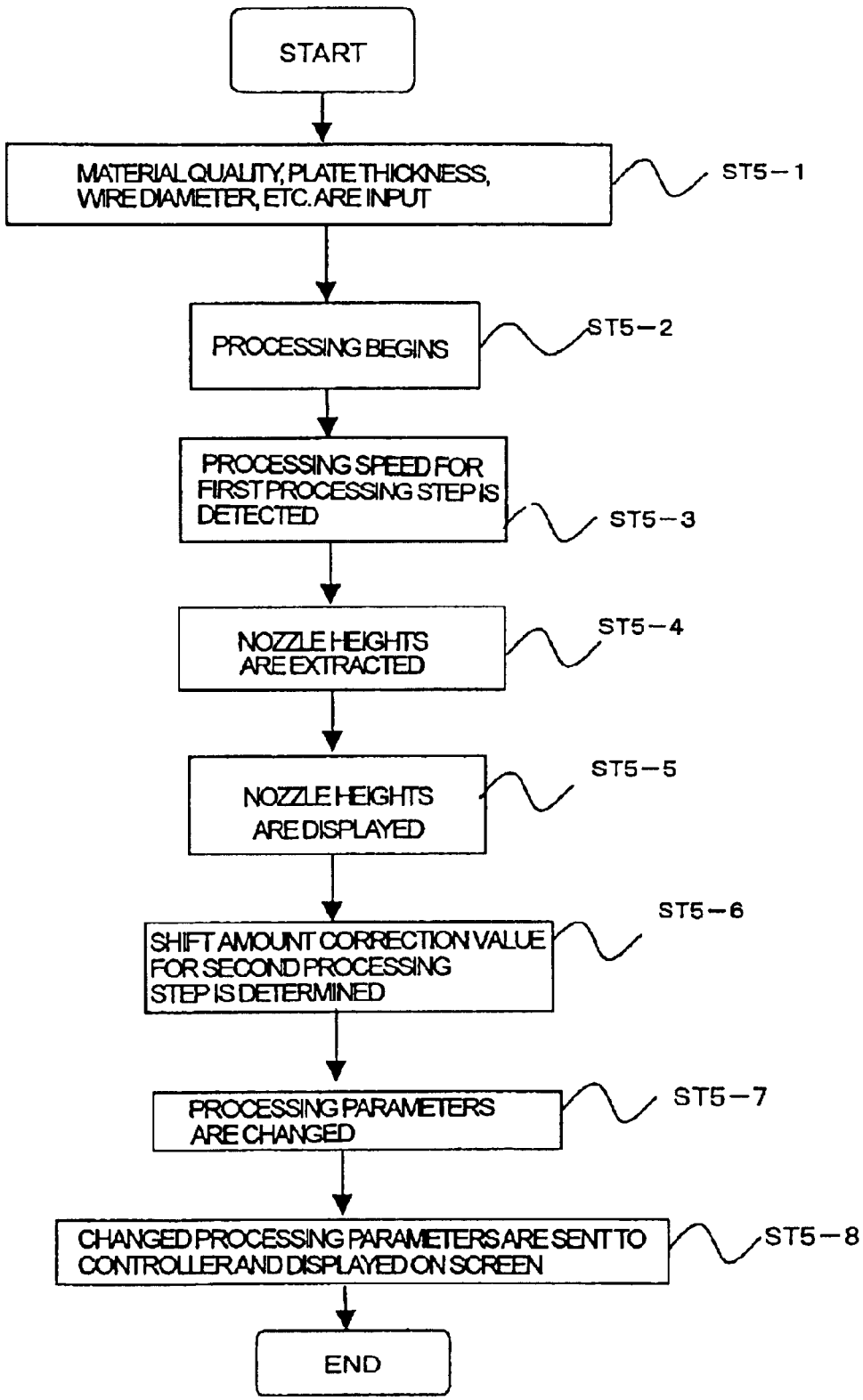
FIG. 16 is a flow chart showing the operation of Embodiment 5 of the present invention.

FIG. 15 is a block diagram showing Embodiment 5 of the present invention, and FIG. 16 is a flow chart showing the operation thereof. In FIG. 15, 1 is input means, and is normally a keyboard as in Embodiment 1. 100 is nozzle height detection means that automatically seeks the nozzle heights, 101 is a processing speed database that stores the relationship between the processing speed and the nozzle separation amounts, and 81 is shift amount correction value determining means. 82 is a shift amount correction value database, which stores, as shown in FIG. 17, shift amount correction values for the accuracy-compensating second processing step corresponding to various combinations of workpiece plate thickness, upper nozzle height and lower nozzle height as shift amount correction values for the shift amount, which is one of the above normal standard processing parameters for the second processing step. The shift amount correction value determining means 81 determines the shift amount correction value based on the data read out from the shift amount correction value database 82. The shift amount correction value data determined by the shift amount correction value determining means 81 is sent to the multi-step shift amount correction value changing means 83. 84 is a multi-step processing parameter storage means, which stores such parameters as the charging voltage, the ON period, the OFF period, the shift amount and the like as standard processing parameters (n steps: n≧1) during nozzle contact (i.e., when the nozzles are in contact with the workpiece). The multi-step shift amount correction value changing means 83 changes the shift amount correction value for the second processing step sent from the multi-step processing parameter storage means 84 based on the shift amount correction value determined by the shift amount correction value determining means 81, outputs it to the controller 85, and displays the shift amount correction value on the screen (not shown) of an output/display means 6.

Figure 18A:
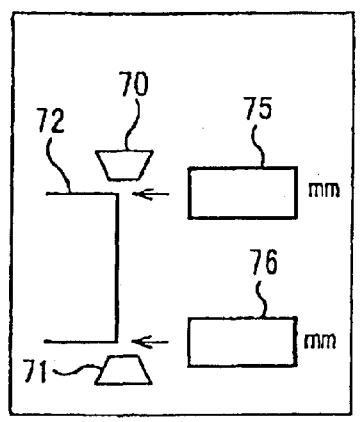
FIGS. 18A–18C are diagrams showing in a graphical fashion the wire nozzle separation state in connection with Embodiments 1–4 of the present invention.
Figure 18B:
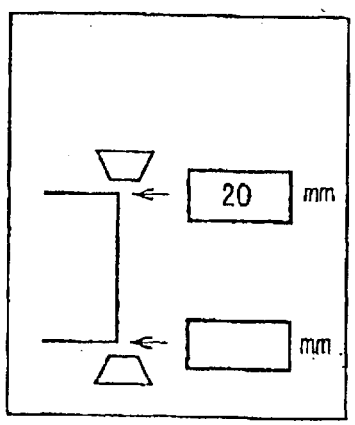
Figure 18C:
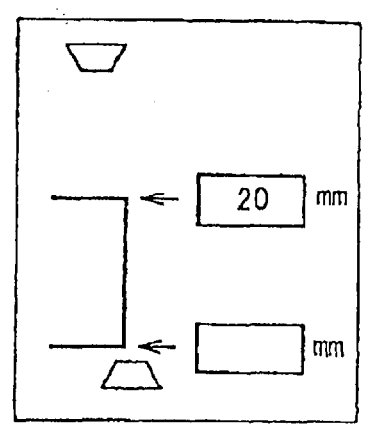
Figure 19:
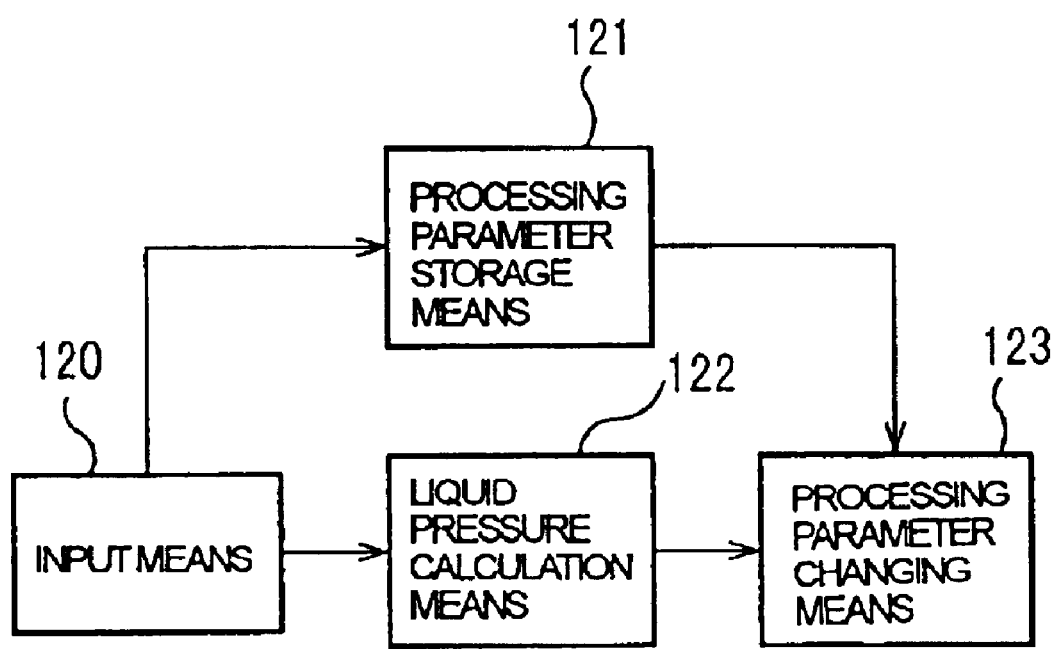
FIG. 19 is a block diagram showing the construction of a conventional wire-electrical discharge machine.

The operation of Embodiment 5 will now be described with reference to FIG. 16. The material quality, plate thickness, wire diameter, and the like are input via the input means 1 (ST 5-1). The standard processing parameters determined based on the material quality, plate thickness, wire diameter and the like where the nozzles are in contact with the workpiece are stored beforehand in the multi-step processing parameter storage means 84, and these standard processing parameters are sent to the multi-step shift amount changing means 83. Processing is then begun (ST 5-2). During the first processing step, the nozzle height detection means 100 detects the processing speed and extracts the nozzle heights from the processing speed database 101 shown in FIG. 15 (ST 5-4), and the nozzle heights are displayed on the screen (not shown) of the display means 6, as shown in FIG. 18C (ST 5-5). Here, FIGS. 18A–18C show a display screen, on which are displayed the upper nozzle 70, the lower nozzle 71, the workpiece 72 and spaces 75 and 76 in which are input the heights of the upper nozzle and the lower nozzle. When the value '20' is displayed in the space 75, as shown in FIG. 18C, this value '20' is converted to coordinate data on the display screen, and the upper nozzle 70 is displayed at a position where the upper nozzle height is 20mm. It is known that when the nozzles are separated from the workpiece, because the amplitude of the wire's oscillation becomes large, the actual processing amount increases, and the processing speed decreases. According to No. 2 of FIG. 17, if the processing speed is '5', the upper nozzle height becomes '20' and the lower nozzle height becomes '0'. When the material quality, plate thickness and wire diameter are input using the input means 1, and the upper nozzle height and lower nozzle height and the like are input from the nozzle height detecting means 100, the shift amount correction value determining means 81 determines the shift amount correction value based on the shift amount correction values in the shift amount correction value database 82 (ST 5-6). For example, where the plate thickness is '10', the upper nozzle separation amount is '20' and the lower nozzle separation amount is '0', the shift amount correction value is '10' according to No. 2 in FIG. 13, and the shift amount correction value for the second processing step of standard processing is determined to be '10'. This '10' information is sent from the shift amount correction value determining means 81 to the multi-step shift amount correction value changing means 83. The multi-step shift amount correction value changing means 83 changes the shift amount, one of the processing parameters for the second processing step of standard processing, using the shift amount correction value (ST 5-7). The processing parameters for the second step in which the shift amount has been changed are sent to the controller 85 together with the processing parameters for the first processing step and the processing parameters for the third and subsequent steps, and are displayed on the screen (not shown) of the output/display means 6 (ST 5-8). The controller 85 performs processing in accordance with the processing parameters.

While the detected nozzle heights are displayed on the display means in Embodiment 5, it is also acceptable if such display is performed when the user inputs the nozzle heights in Embodiments 1-4. In that case, where the user inputs '20' for the nozzle height, as shown in FIG. 18B, when the initial state shown in FIG. 18A is being displayed, the value '20' is converted to coordinate data on the display screen, such that a graphic image in which the upper nozzle has moved to a position 20 mm higher is displayed based on the converted values, as shown in FIG. 18C.

In each of the embodiments described above, input is performed by the user via a keyboard, but it is acceptable if different input means is used, or if values are input from an external system or the like that automatically measures nozzle heights.

In Embodiment 5, because the processing state is detected as the processing speed, correction in accordance with the nozzle heights is automatically performed even if data such as nozzle heights is not input by the user, enabling surface precision to be improved.

Although in each of the above-described embodiments the constituent elements have been described as provided within the wire-electrical discharge machine, they may be provided in a CAD/CAM system separate from the wire-electrical discharge machine, for example. Such a situation is also included in the scope of the present invention, with the understanding that the wire-electrical discharge machine encompasses the separate CAD/CAM system.

Industrial Applicability

Because the present invention prevents wire breakage in a wire-electrical discharge machine, and increases the surface precision and configuration accuracy of the processed surface, it can be advantageously used in wire-electrical discharge machining.

What is claimed is:

1. An electrical discharge machine that infuses a processing liquid in a gap between a wire and a workpiece and processes the workpiece using predetermined processing parameters, said electrical discharge machine comprising:
    processing parameter storage means that stores processing parameters: means that stores a relationship between nozzle height and amount of processing energy;
    processing energy determining means that determines the amount of processing energy during rough processing based on the relationship; and
    processing parameter changing means that changes the processing parameters based on the amount of processing energy, wherein the workpiece is processed using first-step processing parameters changed from standard first-step processing parameters used in a first processing step and using unchanged processing parameters for a second and subsequent processing steps.

2. An electrical discharge machine that infuses a processing liquid in a gap between a wire and a workpiece and processes the workpiece using predetermined processing parameters, said electrical discharge machine comprising:
    processing parameter storage means that stores standard processing parameters;
    means that stores a relationship between a nozzle height and liquid flow rate;
    means that determines rate of liquid flow during rough processing based on the relationship; and
    liquid flow rate changing means that changes a liquid flow rate parameter among the processing parameters, wherein the workpiece is processed using the processing parameters changed.

3. An electrical discharge machine that infuses a processing liquid in a gap between a wire and a workpiece and processes the workpiece using predetermined processing parameters, said electrical discharge machine comprising:
    processing parameter storage means that stores standard processing parameters;
    means that stores a relationship between a nozzle height and wire tilt;
    tilt correction value determining means that determines the wire tilt during processing based on the relationship; and
    tilt correction value changing means that changes a tilt correction value parameter among the processing parameters, whereby the workpiece is processed using the processing parameters changed.

4. An electrical discharge machine that infuses a processing liquid in a gap between a wire and a workpiece and processes the workpiece using predetermined processing parameters, said electrical discharge machine comprising:
    processing parameter storage means that stores standard processing parameters;
    means that stores a relationship between nozzle height and wire shift;
    shift correction value determining means that determines the wire shift during processing based on the relationship; and
    shift amount changing means that changes a wire shift amount parameter among the processing parameters, whereby the workpiece is processed using the processing parameters changed.

5. An electrical discharge machine that infuses a processing liquid in a gap between a wire and a workpiece and processes the workpiece using predetermined processing parameters, said electrical discharge machine comprising:
    processing parameter storage means that stores standard processing parameters;
    nozzle distance detection means that detects a processing state in a first processing step and detects a nozzle distance from the processing state detected; and
    processing parameter determining means that determines the processing parameters for subsequent processing steps based on the nozzle distance detected, wherein the workpiece is processed using the determined processing parameters.

6. The electrical discharge machine according to claim 5, wherein the processing state detected is processing speed.

7. The electrical discharge machine according to claim 5, further comprising means for displaying a state of separation of a wire nozzle in a graphical fashion.

* * * * *